(12) United States Patent
Edwin et al.

(10) Patent No.: US 9,460,362 B2
(45) Date of Patent: Oct. 4, 2016

(54) METHOD AND APPARATUS FOR IDENTIFYING A DESIRED OBJECT OF AN IMAGE USING A SUGGESTIVE MARKING

(71) Applicant: Adobe Systems Incorporated, San Jose, CA (US)

(72) Inventors: Anand Samuel Edwin, Bangalore (IN); Charan Raj, Bangalore (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 14/298,006

(22) Filed: Jun. 6, 2014

(65) Prior Publication Data

US 2015/0356370 A1 Dec. 10, 2015

(51) Int. Cl.
*G06K 9/48* (2006.01)
*G06K 9/46* (2006.01)
*G06T 11/60* (2006.01)
*G06T 7/00* (2006.01)

(52) U.S. Cl.
CPC ........... *G06K 9/4604* (2013.01); *G06T 7/0083* (2013.01); *G06T 11/60* (2013.01); *G06T 2207/20021* (2013.01); *G06T 2207/20096* (2013.01)

(58) Field of Classification Search
CPC ........... G06K 2209/29; G06K 9/4609; G06K 9/4671; G06K 9/6202
USPC ........................................................ 382/199
See application file for complete search history.

(56) References Cited

U.S. PATENT DOCUMENTS

| | | | |
|---|---|---|---|
| 8,913,285 B1 * | 12/2014 | Neubrand | ....................... 358/1.9 |
| 2007/0291134 A1 * | 12/2007 | Hwang et al. | ............. 348/231.2 |
| 2009/0190831 A1 * | 7/2009 | Van Der Putten | ... G06K 9/3216 382/165 |

* cited by examiner

*Primary Examiner* — Manuchehr Rahmjoo
(74) *Attorney, Agent, or Firm* — Keller Jolley Preece

(57) ABSTRACT

A computer implemented method and apparatus for identifying a desired object of an image by using a suggestive marking. The method comprises receiving a first marking to an image, the first marking suggesting a desired object of the image and the desired object being defined by a boundary; generating, based on the first marking, a plurality of output images, wherein each image of the plurality of output images indicates a computer-identified object; and displaying the plurality of output images.

20 Claims, 6 Drawing Sheets

METHOD AND APPARATUS FOR IDENTIFYING A DESIRED OBJECT OF AN IMAGE USING A SUGGESTIVE MARKING

BACKGROUND OF THE INVENTION

1. Field of the Invention

Embodiments of the present invention generally relate to image editing and, more particularly, to a method and apparatus for identifying a desired object of an image using suggestive marking.

2. Description of the Related Art

Currently, image editing software tools allow users to select, as for further processing, one or more objects of an image displayed on an image display device. An object is typically selected by marking, using painting, brushing, or outlining techniques. Selecting an object according to such techniques requires multiple actions using a mouse, a stylus, a finger-swipe or other marking implement. By precisely manipulating the marking device with reference to the image being displayed, a user may select one or more objects of interest.

Compact computing devices, such as laptops, notebook devices, and mobile terminals (e.g., tablets, smartphones and PDAs) are capable of executing image editing software. Given the smaller display screens associated with these devices, however, users may lack the dexterity and/or input precision to accurately identify selected object(s) in the displayed image. Moreover, even a desktop computer user may find the conventional process of marking object(s) of an image to be time consuming and complex—especially when working with images composed of multiple, closely spaced objects.

Therefore, there is a need for a method and apparatus for identifying a desired object of an image using a suggestive marking.

SUMMARY OF THE INVENTION

A method is described for identifying a desired object of an image using suggestive marking. The method comprises receiving a first marking to an image. This first marking suggests an object of an image, where the object is defined by a boundary. The first marking need not conform precisely to this boundary. Based on the first marking, a plurality of output images is generated, where each output image of the plurality of output images indicates a computer-identified object. The plurality of output images is displayed.

In another embodiment, an apparatus for identifying a desired object of an image using a suggestive marking is described. The apparatus includes an object identifying module. The object identifying module receives a first marking on an image. This first marking suggests an object of the image, where the object is defined by a boundary. The apparatus generates a plurality of output images, where each output image of the plurality of output images indicates a computer-identified object. The apparatus displays the plurality of output images.

In yet another embodiment, a non-transitory computer readable medium for identifying a desired object of an image using a suggestive marking is described. The non-transitory, computer readable medium stores instructions that when performed by a processor performs the method for identifying a desired object of an image using suggestive marking.

Figure 1:
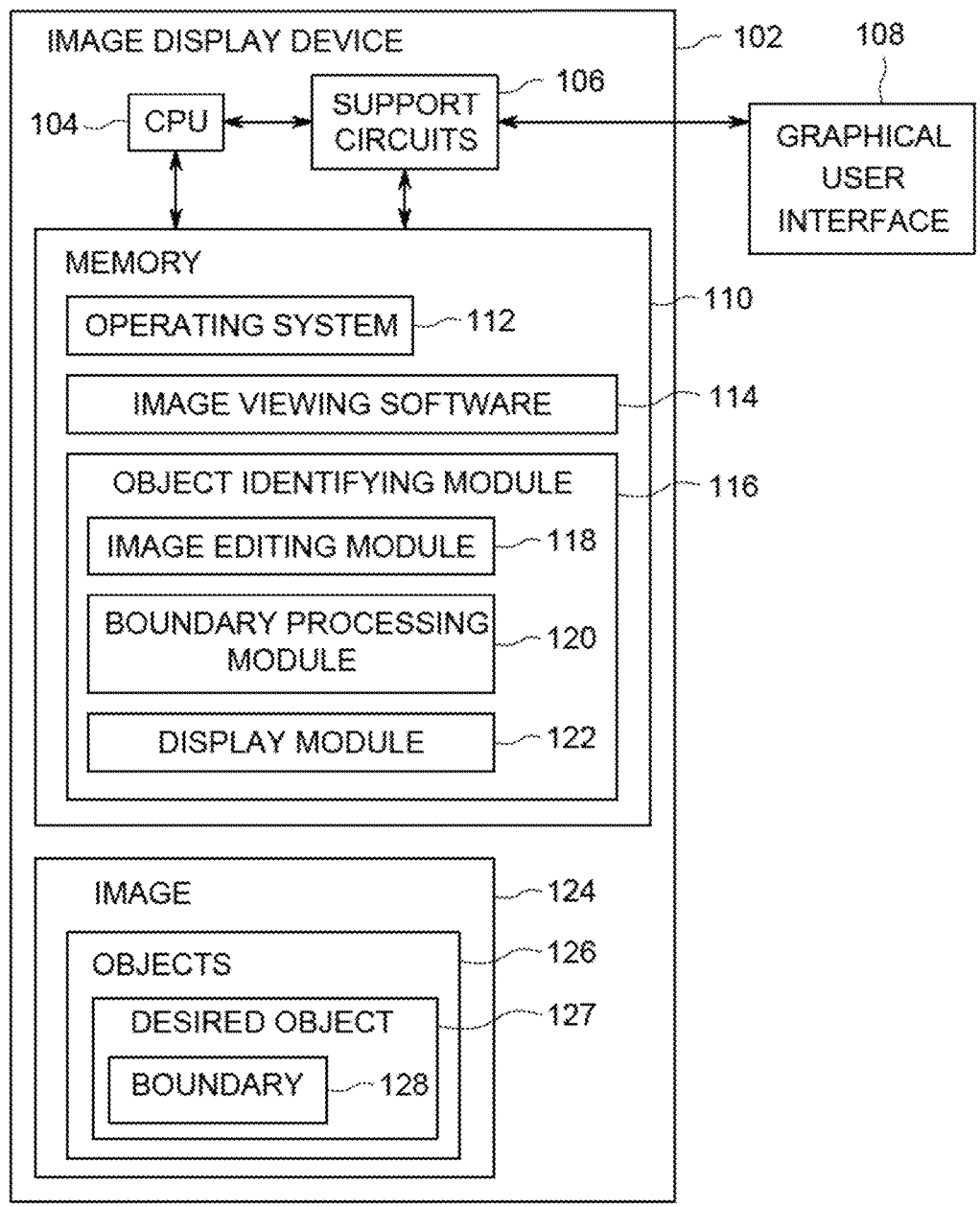
FIG. 1 is a block diagram of an apparatus for identifying a desired object of an image using a suggestive marking according to one or more embodiments.

While the method and apparatus is described herein by way of example for several embodiments and illustrative drawings, those skilled in the art will recognize that the method and apparatus for identifying a desired object of an image using suggestive marking is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for identifying a desired object of an image using suggestive marking defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and an apparatus for identifying a desired object of an image displayed by an image display device, using a received, suggestive marking. The image is a flat image file, meaning there is no concept of pre-defined objects in the file. An object of an image is delineated from other portions of the image (including other objects) by the presence of transitions in the image which are visible to a user (i.e., a boundary). According to embodiments of the invention, a user need not input a precise marking which conforms to a boundary in order for a selected object of the image to be identified. By way of example, a received marking may comprise nothing more than a casual annotation which a user has made to an area of the image within or around an object. Based on this suggestive marking, a plurality of output images derived from the image is generated and these are rendered to the display of the image display device. Each output image of the generated plurality of output images emphasizes, highlights, indicates or otherwise identifies a computer-identified object candidate (or a computer-identified grouping of object candidates) from the original image. The plurality of output images is rendered to the image display. Identification concludes when a user selects, from amongst a displayed plurality of output images derived from the original image, an output image which most accurately identifies the desired object(s) from the perspective of the user. Further processing of the desired object(s) so identified according, for example, to an image editing application, can optionally proceed thereafter.

As used herein, the phrase "suggestive marking" is intended to mean any marking, made by user input, that tags or circumscribes a region of an image such that the region contains substantially more than or substantially less than a corresponding object or grouping of objects being selected by the user. Stated another way, a suggestive marking is one that does not closely conform to the boundary of any particular object of a displayed image. That is, a received suggestive marking is merely a starting point for a computer implemented object identification process.

As noted previously, existing solutions for selecting a desired object of an image are best suited for use in conjunction with image display devices characterized by large displays and user input devices suitable for precisely marking the boundary of the desired object, though even users of these devices may find such processes cumbersome and time consuming. Existing solutions for selecting the desired object require precision in which the marking traces the boundary of the desired object. As applied to more compact image display devices such, for example, as laptops and mobile terminals like smart phones, tablets, and PDAs, the process becomes even more difficult and error-prone. The greater the accuracy demanded by the object marking process, the higher the probability that the user will become frustrated and abandon the image processing process.

Thus, and in accordance with an embodiment of the present invention, techniques are provided herein that allow for processing of an image based on a casual marking of objects in that image. A user accesses the image rendered to a display of an image display device, by execution of image viewing software. In one example, the user is viewing the image to perform image editing where a method described herein is a plug-in to the image editing software capability. The original image contains one or more desired objects, in which each object has a boundary visibly perceptible to the user and that delineates the object from other objects on the image. The objective of the user is to select an object of the image that the user would like to edit.

For example, a user may have gone to the zoo, and taken pictures of various birds in an aviary. The user accesses an image containing a head of a parrot and views the image through the image viewing software capability of the image-display device. The user decides to edit the head of the parrot, so the user must select this desired object in some manner. To this end, the user gestures on the desired object of the image through a graphical user interface of the image display device. The user creates the gesture with a marking implement, such as a mouse, a pointer, a stylus, a finger, an eye-tracking movement, or the like. This gesture action creates a suggestive, first marking. Rather than tracing the boundary, the gesture action produces a marking that is an indication as to the location and/or shape of the boundary. This first marking is the primary input to the method for selecting a desired object (or desired group of objects) by "suggesting" the boundary that defines the object. Suggesting a boundary of the desired object is equivalent to identifying the desired object. The first marking, therefore, provides an indication to the boundary of the desired object.

The first marking can be any shape and any size. In one example, a shape of the first marking is a geometric shape, for example a circle, a triangle, a square, a rectangle or the like. In another example, the shape is a free-handed shape, possibly one that approximates the shape of the desired object. For example, the first marking is completely contained within the desired object. In another example, the first marking completely surrounds the desired object. In yet another example, the first marking is a gesture that crosses the desired object. For example, the first marking can be a circle that circumscribes the head of the parrot object with or without crossing the boundary of the head of the parrot. Alternatively, the first marking can be the circle that is contained within the boundary of the head of the parrot object, with or without crossing the boundary of the head of the parrot.

Once the first marking is received, the desired object is identified by discovering boundaries of the image. Discovering a boundary is accomplished using edge detection software, for example ADOBE® Quick Selection. A marking is derived from the first marking and used as input to an edge detection algorithm. Edge detection identifies an edge in the proximity of the provided marking, in this case, the derived marking. The identified edge that is returned from the edge-detection software is compared to stopping criteria that determine whether a boundary of the desired object has been identified. If an evaluation of the stopping criteria determines the boundary of the desired object is not identified, the derived marking is adjusted by a predefined increment, and edge-detection is invoked again. Iterations of adjusting the derived marking, invoking edge detection, and evaluating criteria are repeated until a stopping criterion has been met. The incremental adjustment can be one that increases or decreases the size of the derived marking relative to the first marking. Additionally, the increment value can be a fixed percentage of the first marking, or the increment value can be a fixed percentage of the changing derived marking. When one of the stopping criteria is met, a desired object is identified. An output image is provided for display with an indication of the computer identified object.

In some embodiments, boundary discovery is repeated using the derived marking until each of the stopping criteria is met. The output result from each boundary discovery is stored. Each output image of the computer identified object is displayed in the image display device as alternatives for selection by a user. The user selects the output result containing the desired object for further image editing by the user. Optionally, after selecting the output result, the user may further augment or refine object selection on the output image by creating an additional marking. This optional step allows the user to select other desired objects on the output image, using the selected output result as the starting image for identifying other desired objects of an image using a suggestive marking. In this option, the user can add, delete, and modify an identified object by creating an additional marking. The additional marking becomes a new first marking for implementing the processing from the start.

As used herein, an image display device can be any electronic device that is capable of displaying electronic images, for example, a computer, laptop, tablet, or Smartphone and the like. As used herein, a marking implement can be a mouse, pointer, stylus, finger, and the like to select and point to an area on the image display device. The marking implement can also be eye tracking software that identifies an area on the image where a user's eyes are focused.

Advantageously, the present invention may be used as a plug-in, hosted service or a feature to an image display software application, such as ADOBE® PHOTOSHOP®, ADOBE® PHOTOSHOP® Elements, or ADOBE® PHOTOSHOP® Touch. The present invention provides a user with a more effective and enjoyable experience in the selection of objects on images displayed on an image display device, independent of the size of the image display device.

Various embodiments of a method and apparatus for identifying a desired object of an image using a suggestive marking are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 illustrates an apparatus 100 configured in accordance with an embodiment of the present invention. The invention will be described in connection with several illustrative examples, which, for clarity have been simplified to describe the identification of a single object in an original image. The invention is equally applicable to the identification of multiple objects and multiple groups of objects in an image. Embodiments can use software executed locally as in cases where the image display device includes, memory, microprocessor for executing instructions for carrying out the steps of the processes, and a display, an optional image acquisition module, such as a camera (not shown). Embodiments can be implemented through hosted solutions, requiring a communications interface and network to the hosting server.

FIG. 1 is a block diagram of an apparatus 100 for identifying a desired object of an image using a suggestive marking. The apparatus 100 includes an image display device 102. The image display device 102 includes or is connected to a graphical user interface 108. The image display device 102 is a computing device, for example a desktop computer, laptop, a mobile phone, tablet computer, and the like. The image display device 102 includes a Central Processing Unit (CPU) 104, support circuits 106, and a memory 110. The CPU 104 may include one or more commercially available microprocessors or microcontrollers that facilitate data processing and storage. The support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like. The graphical user interface 108 is used to allow a user to input information and allows the image viewing software 114 to display information, images, graphics, and the like.

The memory 110 includes an operating system 112, an image viewing software 114, an object identifying module 116, and an image 124. The operating system 112 may include various commercially known operating systems. The image viewing software 114 provides a user with the ability to access and view an image 124 on the image display device 102.

The object identifying module 116 includes an image editing module 118, a boundary processing module 120, and a display module 122. The image editing module 118 may be a plug-in or feature to the image viewing software 114. The image viewing software 114 may be any image viewing software 114, such as ADOBE PHOTOSHOP, ADOBE PHOTOSHOP Elements, ADOBE PREMIERE Elements and the like, capable of image editing. The boundary processing module 120 includes an edge detection algorithm, such as ADOBE Quick Selection, ADOBE Magic Wand, or the like, capable of performing edge detection based on a marking.

The user accesses the image 124 using the image viewing software 114. The image 124 may include one or more objects 126 where each of the one or more objects 126 has a boundary 128. As noted above, the present disclosure describes an exemplary example in which a user selects a single desired object 127. However, the embodiments are capable of identifying a plurality of objects 126 in the image 124. The user invokes the image editing module 118 with an intent of selecting a desired object 127 in the image 124. To select the desired object 127, the user gestures on the image 124 via the graphical user interface 108. The gesture creates a first marking. This first marking is created by the user, with a marking implement, such as a mouse, a pointer, a stylus, or a finger, an eye-tracking movement, or the like. The first marking provides a starting point to identify the desired object 127. The first marking can be any shape and any size. In one example, a shape of the first marking is a geometric shape, for example a circle, a triangle, a square, a rectangle or the like. In another example, the shape is a free-handed shape, possibly one that approximates the shape of the desired object 127. The boundary processing module 120 uses the first marking to identify the desired object 127.

In one embodiment, the boundary processing module 120 uses the first marking to identify a region of the desired object 127. The region is determined to be an area encompassing the first marking. The boundary processing module 120 divides the region into a plurality of sub-regions. Each sub-region is a same shape and same size as all other sub-regions in the plurality of sub-regions. The boundary processing module 120 determines whether a boundary 128 of the desired object 127 is included in each sub-region. Dividing the region into smaller sub-regions improves the accuracy of determining a boundary 128 as compared to processing the region as a whole. In some embodiments, the boundary processing module 120 divides the region into square-shaped sub-regions. In another example, the boundary processing module 120 divides the region into rectangular sub-regions, although any shaped sub-region may be used. Each sub-region contains at least one of the following: no portion of the desired object 127, a portion of desired object 127, a portion of the boundary 128 of the desired object 127, or both a portion of the desired object 127 and a portion of the boundary 128 of the desired object 127. By deconstructing the region of the image 124 into the plurality of sub-regions, the subsequent processing by the boundary processing module 120 is performed on each smaller sub-region.

The boundary processing module 120 performs edge detection within the sub-region. The boundary processing module 120 creates a second marking in each sub-region as the sub-region is processed that is used as input to an edge detection algorithm.

In some embodiments, the second marking is a geometric shape. The second marking is fully enclosed by the edge of the sub-region, and centered in the sub-region. In addition, the second marking is of a size determined based on the size of the sub-region. The second marking is small enough that it may be increased in size without crossing an edge of the sub-region. For example, the second marking is a circle with a center coincident with center of the sub-region and the circle is fully circumscribed by the edges of the sub-region. The boundary processing module 120 increases the size of the second marking by a predefined increment. For example, the increment is a predefined percentage, for example, 50%. The boundary processing module 120 uses the second marking as input to an edge detection algorithm. The edge detection algorithm determines whether the second marking is close to a boundary 128 of the desired object 127 within the sub-region. The boundary processing module 120 generates an edge for the sub-region as returned by the edge detection algorithm. The generated edge is one of the following:
  a) a generated edge of the sub-region which is within a predefined percentage of the first marking, for example 90%, given a portion of the first marking was within the sub-region;
  b) the generated edge of the sub-region which extends beyond the first marking, when a portion of the first marking is in the sub-region; and
  c) the generated edge of the sub-region that does not meet either (a) or (b). For example, a generated edge that is less than the predefined percentage of the first marking and the generated edge is completely within the sub-region.

The generated edge and the area of the desired object 127 within the generated edge of the sub-region are identified graphically. This identified area of the sub-region is an output of the boundary processing module 120 for the sub-region. The boundary processing module 120 stores the identified area for this sub-region.

Using the generated edge of the desired object 127 of the sub-region and the second marking, the boundary processing module 120 evaluates three stopping criteria. The stopping criteria identify whether the generated edge has identified a boundary 128. Since the sub-region is defined by its edges, if a boundary is identified, the boundary could be the boundary 128 of the desired object 127 or the edge of the sub-region. The three stopping criteria are:
  i. if a portion of the first marking is in the sub-region, the generated edge of the sub-region deviates from a corresponding portion of the first marking by a predefined percentage of the first marking, for example, 90%;
  ii. if a portion of the first marking is in the sub-region, the generated edge of the sub-region exceeds a delineation of the first marking; and
  iii. the second marking extends beyond the boundary of the sub-region.

The first stopping criterion is met if the generated edge is in close in proximity to the first marking entered by the user. If the generated edge becomes close in proximity to the first marking, there is a high likelihood that the boundary 128 of the desired object 127 has been identified in the sub-region. This scenario covers the situation where the first marking was larger than the desired object 127.

The second stopping criterion is met if the generated edge exceeds the first marking. The generated edge is said to exceed the first marking when a portion of the first marking is contained within the generated edge. If the generated edge exceeds the first marking, there is a high likelihood that the generated edge identifies the boundary 128 of the desired object 127 in the sub-region. This scenario covers the situation where the first marking was smaller than the desired object.

The third stopping criterion is met if the second marking exceeds beyond the edge of the sub-region. The generated edge is said to exceed beyond the edge of the sub-region when the edge of the sub-region is contained within the generated edge. If the generated edge exceeds the edge of the sub-region, there is high likelihood that the result of edge detection did not find a boundary 128 of the desired object 127 in the sub-region.

If the boundary processing module 120 determines that no stopping criteria has been met, the boundary processing module 120 adjusts the size of the second marking by the predefined increment. The boundary processing module 120 then repeats the steps of performing edge detection, storing output results, and evaluating stopping criteria. When one of the three stopping criteria is met for the given sub-region, the identified area of the sub-region output is stored as a final output result for the sub-region. In some embodiments in which the second or third stopping criterion is met, the final output result for the sub-region optionally uses the stored output result from the immediately preceding iteration. The final output result for the sub-region is used later when the boundary processing module 120 reconstructs the region from the sub-region outputs.

When the stopping criterion for a sub-region is met, the boundary processing module 120 continues to a next sub-region of the plurality of sub-regions and performs boundary processing on the next sub-region. The boundary processing module 120 continues boundary processing until all sub-regions of the plurality of sub-regions are processed. Once all sub-regions are processed, the boundary processing module 120 reconstructs the region using the final output result for each of the sub-regions. In some embodiments in which the second or third stopping criterion is met for a sub-region, the reconstructed region optionally uses the stored output result from the immediately preceding iteration for the sub-region. In other embodiments in which the second or third stopping criterion is met for a sub-region, the reconstructed region uses the final output result and the first marking is overlaid on the reconstructed region. The boundary processing module 120 stores the output image so it may be accessed by the display module 122. The reconstructed region identifies the desired object 127 of the image 124.

The display module 122 displays the output image of the reconstructed region as an alternative for user selection via the image viewing software 114. The selected output image is used for further image editing by the user. Optionally, after selecting an output image, the user may further augment or refine object selection on the output image. This optional step allows the user to select other objects 126 on the output image using a suggestive marking. In this option, the user can add, delete, or modify the identified area of the desired object 127 by creating a new marking and restarting the processing from the beginning. The processing returns to the image editing module 118 and begins processing the new marking per the object identifying module 116.

In another embodiment, after receiving a first marking, the boundary processing module 120 creates a third marking. The third marking has a same shape that is proportionately smaller or larger than the first marking. It is assumed that the first marking suggests the shape of the desired object 127. The third marking is a same shaped marking as the first marking adjusted by a predefined increment, for example, 75%. For example, if the first marking is an outline of the desired object 127, the third marking is the same shaped outline reduced by the predefined percentage amount. In another example, the first marking on the image 124 on the image display device 102 depicts a circle with a diameter of three inches. The third marking is a circle with a diameter less than three inches. Regardless of the shape, the boundary processing module 120 centers the third marking coincident with the first marking, meaning the first and third markings share a same center.

The boundary processing module 120 takes the third marking and increases the size of the third marking by a first predefined increment, where the increment is a percentage increase, for example, 10%, over the initial size of the third marking. The first incremental increase in the size of the third marking results in a marking of intermediate size between an initial size of the third marking and the size of the first marking. The boundary processing module 120 in this embodiment, searches for a boundary 128 by incrementally increasing the search area by increasing the third marking. It is understood by those skilled in the art that searching for a boundary 128 can also be achieved by incrementally decreasing the search area by decreasing the third marking. The boundary processing module 120 uses the third marking as input to the edge detection algorithm. The edge detection algorithm determines whether the third marking is close to a boundary 128 of the desired object 127. The boundary processing module 120 generates an edge as returned by the edge detection algorithm. The generated edge is one of the following:

a) a generated edge of the desired object 127 which is within a predefined percentage of the first marking, for example 90%;

b) the generated edge of the desired object 127 which extends beyond the first marking; and c) the generated edge does not meet either (a) or (b). For example, the generated edge is less than the predefined percentage of the first marking, and the generated edge is completely within the desired object 127.

The generated edge and the area of the desired object 127 within the generated edge are identified graphically. The identified area of the desired object 127 is an output of the boundary processing module 120 and the identified area of the desired object is stored as an output image of the image 124.

The boundary processing module 120 proceeds to evaluate whether the generated edge meets one of three stopping criteria. If any one of the stopping criteria is met, then the boundary processing module 120 determines that a boundary 128 of the desired object 127 has been identified. The three stopping criteria are:

i) the generated edge in the desired object 127 is a predefined percentage of the first marking, for example, 90%;

ii) the generated edge in the desired object 127 exceeds a delineation of the first marking; or iii) the third marking extends beyond the first marking.

The first stopping criterion is met if the generated edge is in close in proximity to the first marking entered by the user. If the generated edge is in close in proximity, there is a high likelihood that the boundary 128 of the desired object 127 has been identified. This scenario covers the situation where the first marking is larger than the desired object 127.

The second stopping criterion is met if the generated edge exceeds the first marking. The generated edge is said to exceed the first marking when the first marking is contained within the generated edge. If the generated edge exceeds the first marking, there is a high likelihood that the edge detection identified the boundary 128 of the desired object 127. This scenario covers the situation where the first marking is smaller than the desired object 127.

The third stopping criterion is met if the third marking exceeds the first marking. The generated edge is said to exceed the first marking when the first marking is contained within the third marking. If the third marking exceeds the first marking, there is high likelihood that the result of edge detection exceeded the boundary 128 of the desired object 127.

If the boundary processing module 120 determines that none of the three stopping criteria has been met, the boundary processing module 120 repeats the steps of increasing the size of the third marking by a second increment, performing edge detection, storing output results, and evaluating stopping criteria. The rationale for this repetition is to increase the search area for the boundary 128 within the desired object 127. The second incremental increase is not dependent on the first incremental increase. For example, the second incremental increase is one of greater than, less than or equal to the first incremental increase. As there may be more than one iteration of these processing steps, on the "n-th" iteration, a corresponding n-th increment has a value that is one of greater than, less than, or equal to the previous "n−1" increment. When one of the three stopping criteria is met for the given desired object 127, the identified area of the desired object 127 on the image 124 is stored. In some embodiments in which the second or third stopping criterion is met for a sub-region, the boundary processing module 120 uses the output result from the "n−1" repetition. In other embodiments, the identified area of desired object 127 on the image 124 is overlaid with the first marking. The boundary processing module 120 stores this output image so it may be accessed by the display module 122. The output image identifies the desired object 127 of the image 124.

The display module 122 displays the output image as an alternative for user selection through the image viewing software 114. The user selects an output image as a final selected output image containing the desired object 127.

If the user is satisfied that the object in the output image identifies the desired object 127, the user continues to perform other image editing. Optionally, after selecting an output image, the user may further augment or refine object selection on the output image. This optional step allows the user to select other objects 126 other than the desired object 127 on the output image, using a suggestive marking. In this option, the user can add, delete, or modify the identified area of the desired object 127 by creating a new marking and restarting the processing from the beginning. For this option, the processing returns to the image editing module 118 and begins processing the new marking per the object identifying module 116.

Figure 2:
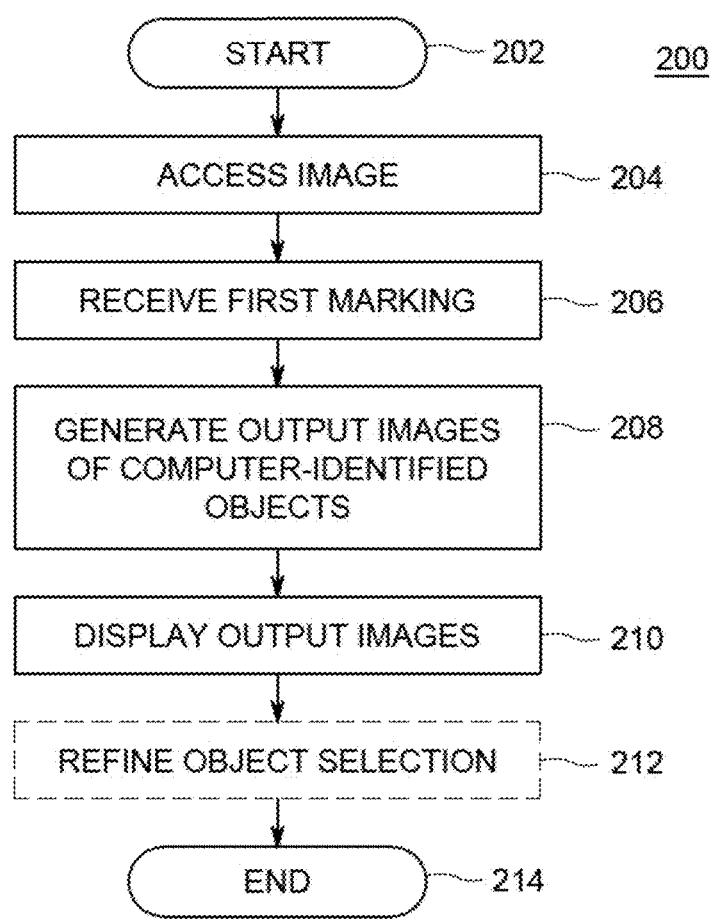
FIG. 2 depicts a flow diagram of a method for identifying a desired object of an image using a suggestive marking as performed by the object identifying module of FIG. 1, according to one or more embodiments.

FIG. 2 depicts a flow diagram of a method 200 for identifying a desired object of an image using a suggestive marking as performed by the object identifying module 116 of FIG. 1 according to one or more embodiments. The method 200 is initiated when a user marks an image in order to identify a desired object. The method 200 identifies an object in the image as identified by boundary-detection, and displays the output image with the identified object for the user's selection. The method 200 starts at step 202 and proceeds to step 204.

At step 204, the method 200 accesses an image using an image viewing software of the image display device. For example, a user is viewing the image to perform image editing. The accessed image contains at least one object, a desired object from the perspective of the user who is viewing the image. The desired object of the image is characterized by having a boundary delineating the desired object from other objects in the image. The method 200 proceeds to step 206.

At step 206, the method 200 receives a first marking. The first marking is a gesture made on the image through the graphical user interface. The first marking suggests the desired object of the image. The user creates this first marking to provide a starting point for the method 200 to identify the desired object. The method 200 identifies the desired object by identifying a boundary of the desired object. The first marking is created by the user, using for example, a stylus, a mouse, a finger, or eye-tracking software. The first marking can be any shape and any size. For example, the shape is a free-handed shape, possibly one that approximates the shape of the desired object. In another example, the shape can be a geometric shape; a circle, a square, a rectangle. In one example, the first marking is completely contained within the boundary of the desired object. In another example, the first marking completely surrounds the boundary of the desired object. In another example, the first marking is a gesture that crosses the boundary of the desired object. The first marking is the initial input for method 200 to determine when a boundary of the desired object has been identified. The method 200 proceeds to step 208.

At step 208, the method 200 identifies when a boundary of the desired object is found is determined. The method 200 uses the first marking to perform edge detection to identify the desired object of the image, suggested by the first marking as described in further detail with respect to FIG. 3 and FIG. 4 below. The method 200 proceeds to step 210.

At step 210, the method 200 displays an output image created by the processing of the first marking. The output image with an identified object is presented to the user as an alternative for selection through the image viewing software. The user may select the output image and then continue editing the output image. The method 200 proceeds to step 212.

At step 212, the method 200 permits the user, as an option, to augment or refine object selection on the output image. This optional step allows the user to select other desired objects on the output image. The user is able to identify additional desired objects by creating a suggestive marking on the selected output image. In this option, the user can add, delete, or modify the identified area of the desired object by creating a new marking and implementing the method 200 from the beginning. For this option, the method 200 returns to the image editing software and begins processing per the object identifying software. If no modifications to the selected output image are made, the method 200 proceeds to step 214 and ends.

Figure 3:
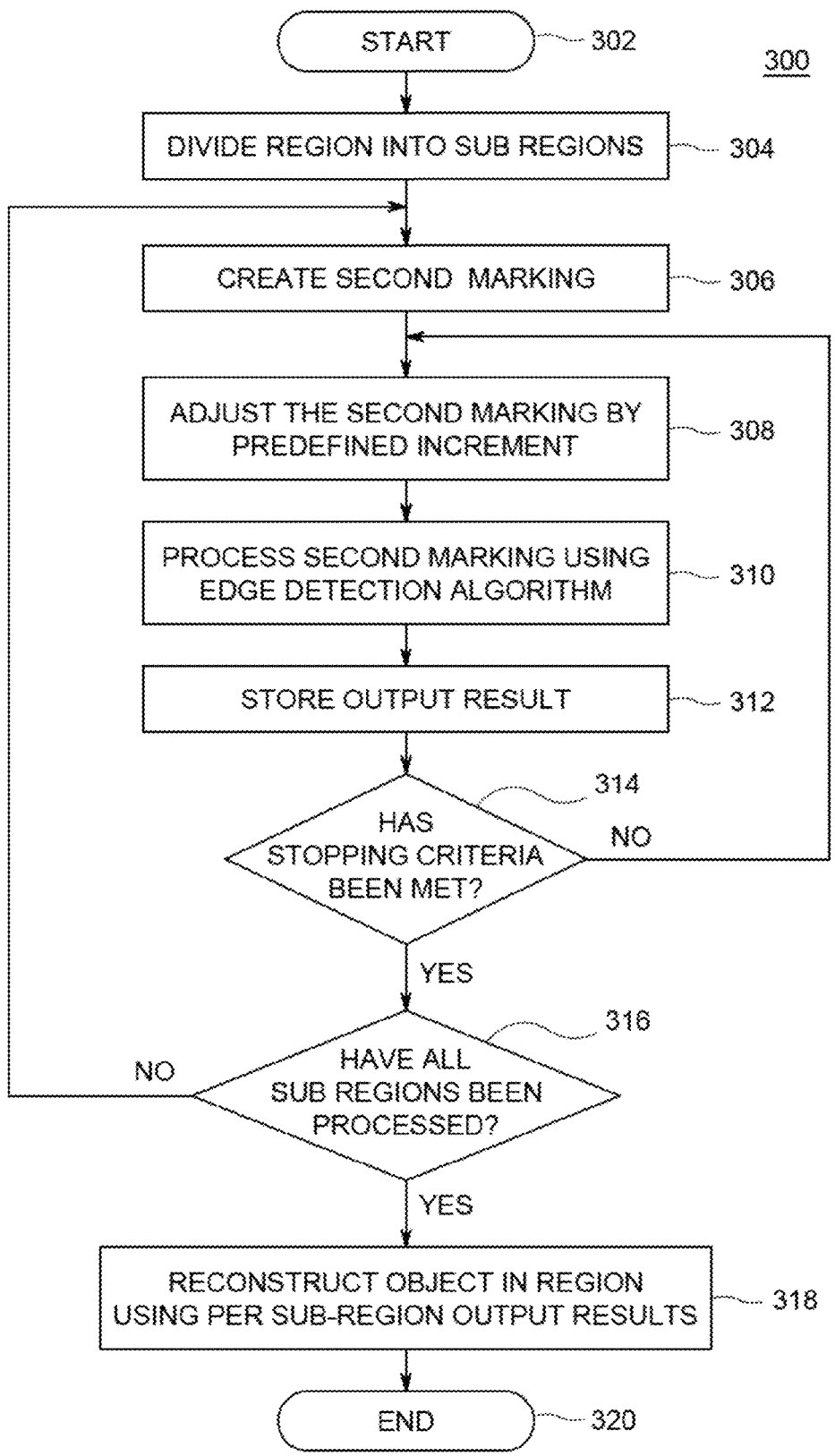
FIG. 3 depicts a flow diagram of a method for processing markings that suggest boundaries of objects on images as performed by the boundary processing module of FIG. 1, according to one or more embodiments.

FIG. 3 depicts a flow diagram of a method 300 for processing markings that suggest boundaries of objects on images as performed by the boundary processing module 120 of FIG. 1, according to one or more embodiments. In one example, the first marking is used to identify a region as suggested by the area encompassing the boundary of the first marking while boundary processing is performed. The method 300 starts at step 302 and proceeds to step 304.

At step 304, the method 300 divides the region into sub-regions, where a sub-region is the same shape and same size as all other sub-regions in the plurality of sub-regions. In some embodiments, the method 300 divides the region into square-shaped sub-regions; however, any shaped sub-region may be used. As an example, the region identified by the first marking is a rectangle with a length edge equal to 4 inches and a width edge equal to 3 inches. The method 300 divides the region into 12 square regions, where each square has length and width edges equal to one inch. Each sub-region of the plurality of sub-regions contains at least one of the following: no portion of the desired object, a portion of the desired object, a portion of the boundary of the desired object, or both a portion of the desired object and a portion of the boundary of the desired object. The method 300 processes each sub-region using steps 306 through 312 below. The method 300 proceeds to step 306.

At step 306, the method 300 creates a second marking for the sub-region. In some embodiments, the second marking has a geometric shape, for example a circle. The second marking is centered in the sub-region. The second marking is fully circumscribed by the edge of the sub-region. For example, the second marking is a circle centered in the sub-region and the circle is fully circumscribed by the edges of the sub-region. Continuing with the above example, each sub-region is a square with one inch edges. The second marking is a circle with a radius of one quarter inch or equivalently a diameter of one half inch. The circle is completely circumscribed by the square and has area that can be increased in size and still be within the boundary of the sub-region. The method 300 proceeds to step 308.

At step 308, the method 300 increases the second marking by a predefined increment, for example, 10%. This increment is used to increase the size of the second marking to expand the search area of a boundary of the object by edge detection. The first incremental increase in the size of the second marking results in a marking of an intermediate size between the initial size of the second marking and the edges of the sub-region. The method 300 proceeds to step 310.

At step 310, the method 300 processes the second marking using an edge detection algorithm. The edge detection algorithm is used to identify a boundary of the desired object within the sub-region, using the second marking as an input. The method 300 generates an edge for the sub-region as returned by the edge detection algorithm. The generated edge is one of the following:

a) a generated edge of the sub-region which is within a predefined percentage of the first marking, for example, 90%, given a portion of the first marking was within the sub-region;

b) the generated edge of the sub-region which extends beyond the first marking, when a portion of the first marking is in the sub-region; and c) the generated edge of the sub-region that does not meet either (a) or (b). For example, a generated edge that is less than the predefined percentage of the first marking and the generated edge is completely within the sub-region.

The generated edge and the area of the desired object within the generated edge of the sub-region are identified graphically. This identified area of the sub-region is an output result for the sub-region. The method 300 proceeds to step 312.

At step 312, the method 300 stores the output result. The output result is the identified area of the sub-region and is associated and stored with the sub-region. The method 300 proceeds to step 314.

At step 314, the method 300 determines whether one of three stopping criteria for processing the sub-region has been met. Each of the three stopping criteria determines whether a boundary of the desired object has been identified by the generated edge. Since the sub-region is defined by its edges, if a boundary is identified, the boundary is one of either the boundary of the object or the edges of the sub-region. The three stopping criteria are:

i) if a portion of the first marking is in the sub-region, the generated edge of the sub-region deviates from a corresponding portion of the first marking by a predefined percentage of the first marking, for example, 90%;

ii) if a portion of the first marking is in the sub-region, the generated edge of the sub-region exceeds a delineation of the first marking; and iii) the second marking extends beyond the boundary of the sub-region.

The first stopping criterion is met if the generated edge is in close in proximity to the first marking entered by the user. If the generated edge becomes close in proximity to the first marking, there is a high likelihood that the boundary of the desired object has been identified in the sub-region. The second stopping criterion is met if the generated edge exceeds the first marking. In such case, there's a high likelihood that the edge detection identified the boundary of the desired object in the sub-region. The third stopping criterion is met if the third marking exceeds the first marking. In such case, there is high likelihood that the result of edge detection exceeded the boundary of the desired object in the sub-region.

If no stopping criteria has been met, the method 300 proceeds to step 308 and iterates until one of the three stopping criteria is met. However, when one of the three stopping criteria is met for the given sub-region, the method 300 stores the identified area of the sub-region output and the processing of the sub-region is completed. In some embodiments in which the second or third stopping criterion is met, the final output result for the sub-region optionally uses the stored output result from the immediately preceding iteration. The identified area of the sub-region is used later when the region is reconstructed from the sub-region outputs. The method 300 proceeds to step 316.

At step 316, the method 300 determines whether all sub-regions have been processed. If there is at least one sub-region of the plurality of sub-regions unprocessed, the method 300 proceeds to step 306 and the method 300 iterates until all sub-regions are processed. However, if the method determines that all sub-regions have been processed, the method 300 proceeds to step 318.

At step 318, the method 300 reconstructs the desired object in the region of the image using the output result from each sub-region. The method 300 reconstructs the region that was divided into sub-regions by using the final output from each sub-region. In some embodiments in which the second or third stopping criterion is met for a sub-region, the reconstructed region optionally uses the stored output result from the immediately preceding iteration for the sub-region. In other embodiments in which the second or third stopping criterion is met for a sub-region, the reconstructed region uses the final output result and the first marking is overlaid on the reconstructed region. The method 300 retrieves the final output result for each sub-region and creates an output image of the desired object originally suggested by the first marking. The output image is stored. The method 300 proceeds to step 320 and ends.

Figure 4:
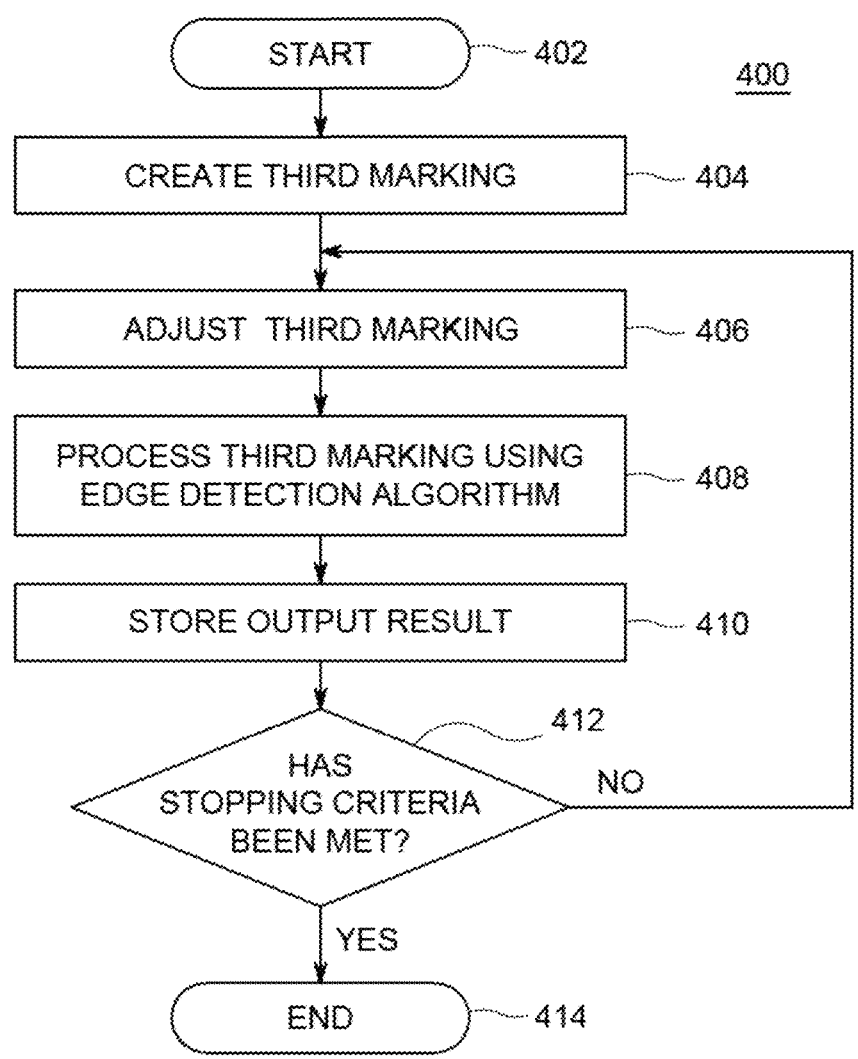
FIG. 4 further depicts a flow diagram of a method for processing markings that suggest a desired one or more objects on an image as performed by the boundary processing module of FIG. 1, according to one or more embodiments.

FIG. 4 further depicts a flow diagram of a method 400 for processing markings that suggest a desired one or more objects on an image as performed by the boundary processing module 120 of FIG. 1, according to one or more embodiments. The method 400 uses a marking, received from the user, to identify an object in an image, the object suggested by the marking. A first marking was received from a user at step 206 above. The method 400 starts at 402 and proceeds to step 404.

At step 404, the method 400 creates a third marking. The third marking has a same shape that is proportionately smaller than the first marking, adjusted by a predefined increment, for example, 75%. For example, the first marking is an outline of the desired object and the predefined increment is 60%. In this example, the third marking is the same shape as the first marking, reduced by the predefined increment, 60%. In another example, the first marking is a circle with a diameter of four inches and the predefined increment of 75%. In this example, the third marking is a circle created with a diameter of one inch. Regardless of the shape, the method 400 centers the third marking coincident with the first marking, meaning the first and third markings share a same center. The method 400 proceeds to step 406.

At step 406, the method 400 increases size of the third marking by a first predefined increment, for example, 10%. This first incremental increase in the size of the third marking results in a marking of intermediate size between an initial size of the third marking and the size of the first marking. This increment is used to increase the size of the third marking to expand the search area for a boundary of the object by an edge detection algorithm. The method 400 proceeds to step 408.

At step 408, the method 400 processes the third marking using an edge detection algorithm. The edge detection algorithm may be any edge detection algorithm. The edge detection algorithm determines whether the third marking is close to a boundary of the desired object. The method 400 generates an edge returned by the edge detection algorithm. The generated edge is one of the following:

a) a generated edge of the desired object which is within a predefined percentage of the first marking, for example 90%;
b) the generated edge of the desired object which extends beyond the first marking; and
c) the generated edge does not meet either (a) or (b). For example, the generated edge is less than the predefined percentage of the first marking, and the generated edge is completely within the desired object.

The generated edge and the area of the desired object within the generated edge are identified graphically. The identified area of the desired object is an output result. The method 400 proceeds to step 410.

At step 410, the method 400 stores the output result. This output result is the identified area of the desired object of the image. The method 400 proceeds to step 412.

At step 412, the method 400 determines whether one of three stopping criteria for processing the object of the image has been met. Each of the three stopping criteria determines whether a boundary of the desired object has been identified by the generated edge. The three stopping criteria are:

i. the generated edge in the desired object is a predefined percentage of the first marking, for example 90%;
ii. the generated edge in the desired object exceeds a delineation of the first marking; or
iii. the third marking extends beyond the first marking.

The first stopping criterion is met if the generated edge is in close in proximity to the first marking entered by the user. In such case, there is a high likelihood that the boundary of the desired object has been identified. The second stopping criterion is met if the generated edge exceeds the first marking. In such case, there is a high likelihood that the generated edge identifies the boundary of the desired object. The third stopping criterion is met if the third marking exceeds the first marking. In such case, there is a high likelihood that the result of edge detection exceeded the boundary of the desired object.

If the method 400 determines that no stopping criteria has been met, the method 400 proceeds to step 406 and iterates until one of the stopping criteria is met. However, when one of the three stopping criteria is met for the given desired object, the identified area of the output is stored as final output result. In some embodiments in which the second or third stopping criterion is met, the method 400 optionally uses the stored output result from the immediately preceding iteration for final output result. In other embodiments in which the second or third stopping criterion is met, the method 400 optionally uses as the final output result, the identified area with the first marking overlaid upon the identified area. Processing of the boundary of the desired object is complete. The method 400 proceeds to 414 and ends.

Figure 5:
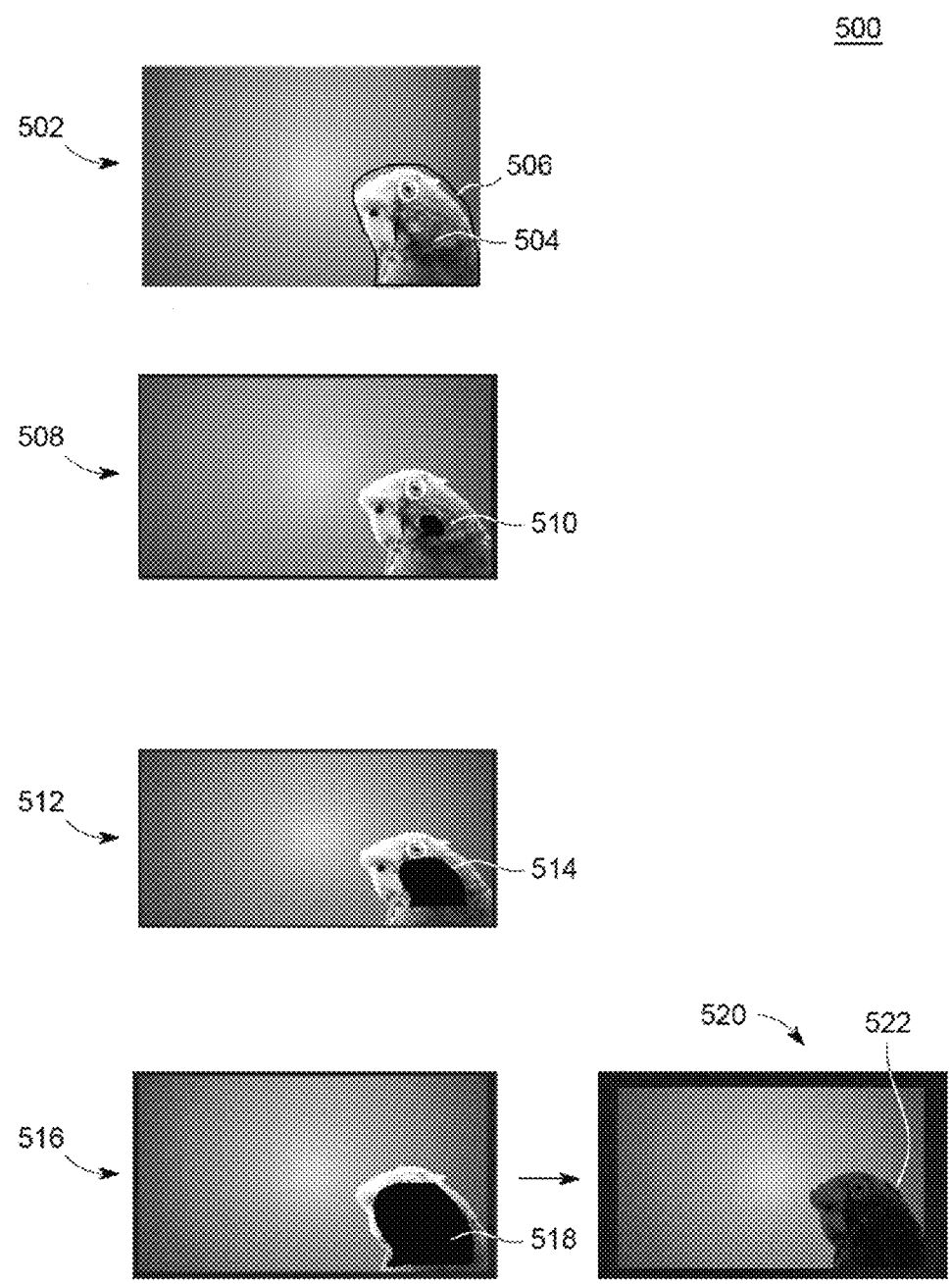
FIG. 5 illustrates the manner in which a first image to which a suggestive marking has been applied is processed to perform object identification according to one or more embodiments.

FIG. 5 illustrates how identifying a desired object of an image using a suggestive marking is performed according to one or more embodiments. Image 502 depicts a desired object 504, the head of a parrot, on the image 502. The user has accessed the image 502 on an image display device and has created a first marking 506 via the graphical interface. The first marking 506 is used to identify the desired object 504. In this example, the first marking 506 is a free-hand outline of the head of the parrot. A marking is derived from the first marking 506. Derived marking is referred to as the third marking in method 400 above. The third marking 510 maintains the shape of the first marking 506, but reduces the size proportionately by a predefined increment, in this example, 75%. This third marking 510 is placed on the desired object such that the center of the third marking 510 is coincident with the center of the first marking 506. In this example the region interior to the third marking 510 is shaded in order to illustrate the shape and size of the third marking 510 in image 508.

The third marking 510 is increased in size, by the predefined increment, in this example, 25%. The increased third marking 514 is depicted in image 512. The increased third marking 514 is the input to the edge detection algorithm. The edge detection algorithm generates an identified edge based on the input increased third marking 514. The area within the generated edge is shaded and stored. The three stopping criteria are evaluated to determine whether a boundary of the object has been identified. If a boundary of the desired object 504 has not been identified, the increased third marking 514 is increased once again as 518 in image 516. Finally, the edge detection algorithm generates an edge that represents the boundary of the desired object 504. The generated edge identifies the boundary 522 of the head of the parrot. This output image, image 520, is stored for later display to the user.

Figure 6:
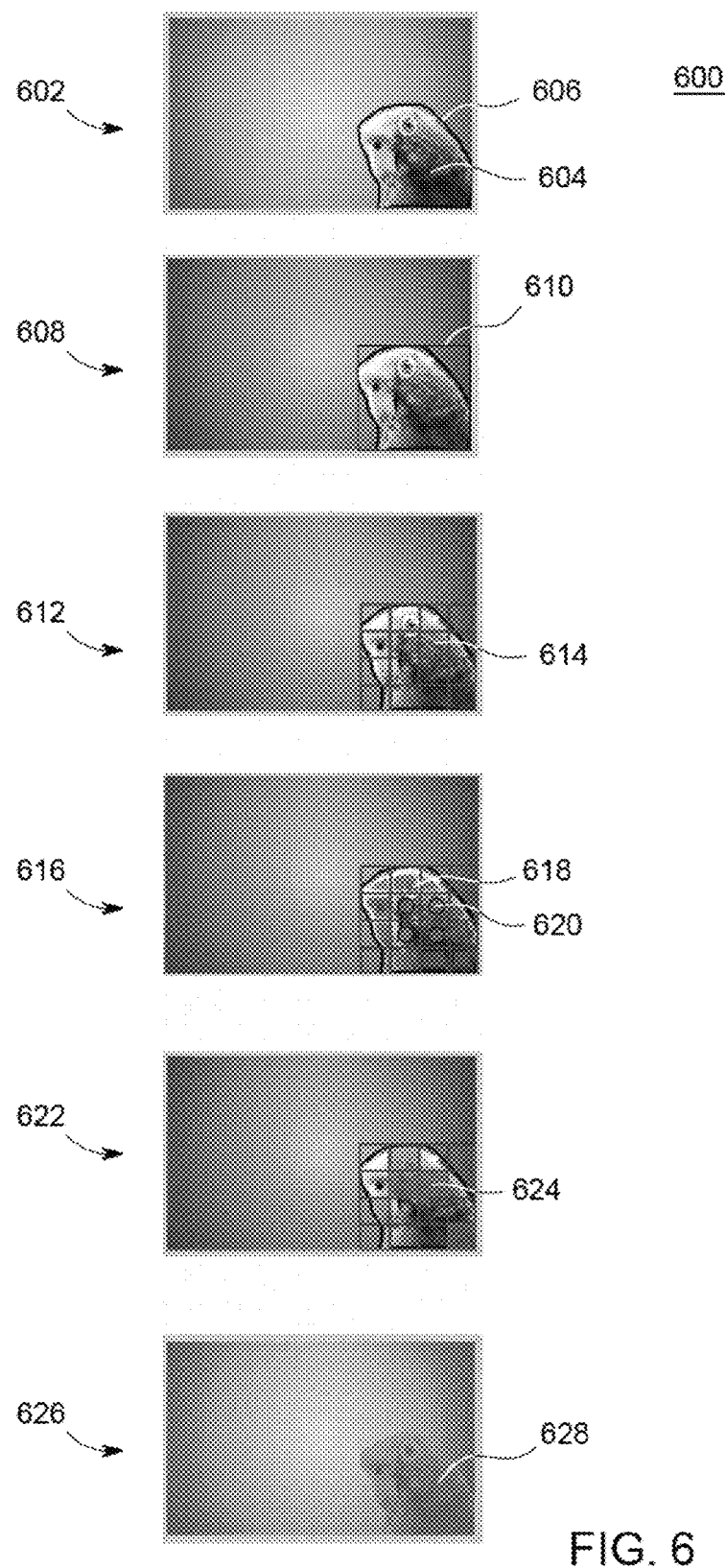
FIG. 6 illustrates the manner in which a second image to which a suggestive marking has been applied is processed to perform object identification, in which sub-regions of the image are created for boundary analysis according to one or more embodiments.

FIG. 6 illustrates how identifying a desired object of an image using a suggestive marking is performed according to one or more embodiments. Image 602 depicts a desired object 604, the head of a parrot, on the image 602. The user has accessed the image 602 on an image display device and has created a first marking 606 via the graphical interface. The first marking 606 is used to identify the desired object 604. In this example, the first marking 606 is a free-hand outline of the head of the parrot. A region 610 suggested by an area encompassing the first marking 606 is created and depicted in 608. The region 610 is divided into a plurality of sub-regions 614 as depicted in 612, where each sub-region is processed individually. In this example, there are sixteen sub-regions within the plurality of sub-regions. A second marking is created for each sub-region in the plurality of sub-regions 614. In one embodiment, a geometric figure, a circle, is used to create the second marking 618. In another embodiment, in which a portion of the original first marking is within the sub-region, the portion of the first marking 606 is used as a non-geometric shaped second marking 620. The interior of the second marking 618 and 620 are shaded for clarity.

The second marking 618, the circle, is adjusted in size by a predetermined increment, in this case increased by 10%, to expand the search area of a boundary of the object in the sub-region. The adjusted second marking is the input to an edge detection algorithm. The edge detection algorithm generates an identified edge based on the input. The area within the generated edge 624 is shaded and stored as depicted in 622. The three stopping criteria are evaluated to determine whether a boundary of the object or the edge of the sub-region has been identified. One stopping criterion has been met and processing for this sub-region is complete. Processing of sub-regions within the plurality of sub-regions continues until all sub-regions have been processed, in this example sixteen sub-regions 614. A desired object 628 in the image 626 using the output result from each sub-region is reconstructed.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
recognizing user input indicating a first marking to an image, the first marking being in relation to a visual object in the image, the object having a boundary, wherein the object is non-predefined;
performing edge detection about the first marking to detect a first potential boundary in the image for the object;
performing edge detection at a predefined increment from the first potential boundary for the object to detect a second potential boundary for the object;
generating, based on the detected first and second potential boundaries, a plurality of output images, wherein each output image of the plurality of output images includes one of the first or second potential boundaries for the object; and
providing the plurality of output images to allow for selection of an output image of the plurality of output images with a potential boundary that corresponds with the boundary of the object.

2. The method of claim 1, further comprising:
receiving a selection of an output image of the plurality of output images displayed; and
refining object selection on the selected output image.

3. The method of claim 1, wherein generating the plurality of output images further comprises, for each output image:
(i) dividing a region of the image associated with the first marking into a plurality of sub-regions;
(ii) for each sub-region of the plurality of sub-regions:
(a) creating a second marking within the sub-region wherein the second marking is a geometric shape circumscribed by a boundary of the sub-region;
(b) adjusting a size of the second marking by a predefined increment;
(c) generating an edge of the sub-region of the object using edge detection, where the second marking is an input to an edge detection algorithm;
(d) storing an output result of an area of the sub-region bounded by a generated edge;
(e) identifying a generated edge of the sub-regions as a boundary of the object or a boundary of the sub-region by repeating steps (b), (c), and (d) until:
(1) if a portion of the first marking is in the sub-region, the generated edge of the sub-region deviates from a corresponding portion of the first marking by a predefined percentage;
(2) if a portion of the first marking is in the sub-region, the generated edge of the sub-region exceeds a delineation of the first marking; or
(3) the second marking extends beyond the boundary of the sub-region; and (iii) combining the output result of each sub-region of the plurality of sub-regions to reconstruct the object of the region of the image.

4. The method of claim 3, wherein generating the plurality of output images further comprises, for each output image:
  (i) creating a third marking where the third marking is a same shape as the first marking and decreased in size;
  (ii) increasing a size of the third marking by a predefined increment;
  (iii) generating an edge of the object using edge detection, where the third marking is an input to an edge detection algorithm;
  (iv) storing an output result of an area bounded by the edge generated; and
  (v) identifying a generated edge as a boundary of the object by repeating steps (ii), (iii), and (iv) until:
  (a) the generated edge in the object is a predefined percentage of the first marking;
  (b) the generated edge in the object exceeds a delineation of the first marking; or
  (c) the third marking extends beyond the first marking.

5. The method of claim 1, wherein generating the plurality of output images further comprises, for each output image:
  (i) creating a second marking where the second marking is a same shape as the first marking but decreased in size;
  (ii) increasing a size of the second marking by a predefined increment;
  (iii) generating an edge of the object using edge detection, where the second marking is an input to an edge detection algorithm;
  (iv) storing an output result of an area bounded by the edge generated; and
  (v) identifying a generated edge as a boundary of the object by repeating steps (ii), (iii), and (iv) until:
  (a) the generated edge in the object is a predefined percentage of the first marking;
  (b) the generated edge in the object exceeds a delineation of the first marking; or
  (c) the second marking extends beyond the first marking.

6. The method of claim 5, wherein a first incremental increase in the size of the second marking results in a marking of intermediate size between an initial size of the second marking and a size of the first marking.

7. The method of claim 6, wherein the first incremental increase is a percentage increase over the initial size of the second marking.

8. The method of claim 6, wherein a second incremental increase in the size of the second marking results in a marking having a size between the intermediate size and the size of the first marking.

9. The method of claim 8, wherein the first and second incremental increases are equal.

10. The method of claim 1, wherein receiving the first marking to the image comprises collecting user suggestive marking input where the user suggestive marking input does not conform to the boundary of a selected object.

11. The method of claim 1, wherein the object is non-predefined due to a shape, a size, and a type of the object being unknown.

12. An apparatus for identifying an object of an image using a suggestive marking comprising:
  a computer having one or more processors; and
  a storage medium storing instructions thereon that, when executed by the one or more processors, cause the apparatus to:
    recognize user input indicating a first marking to an image, wherein the first marking suggests an object of the image, the object having a boundary, wherein the object is non-predefined;
    divide a region of the image associated with the first marking into a plurality of sub-regions;
    for each sub-region of the plurality of sub-regions, perform edge detection within the sub-region to identify either:
    a presence of a boundary portion of the boundary of the object within the sub-region, or
    that no boundary portions of the boundary of the object are within the sub-region;
    generate an output image that combines each sub-region that includes an identified boundary portion of the boundary of the object to form a single computer-identified object defined by the identified boundary portions that estimates the single boundary of the object; and
    provide the output image to user for confirmation of the boundary of the object.

13. The apparatus of claim 12, wherein the instructions, when executed by the one or more processors, cause the apparatus to:
  refine object selection on the output image.

14. The apparatus of claim 12, wherein the instructions, when executed by the one or more processors, cause the apparatus to:
  (i) create a third marking where the third marking is a same shape as the first marking and decreased in size;
  (ii) increase a size of the third marking by a predefined increment;
  (iii) generate an edge of the object using edge detection, where the third marking is an input to an edge detection algorithm;
  (iv) store an output result of an area bounded by the edge generated; and
  (v) identify a generated edge as a boundary of the object by repeating steps (ii), (iii), and (iv) until:
  (a) the generated edge in the object is a predefined percentage of the first marking;
  (b) the generated edge in the object exceeds a delineation of the first marking; or
  (c) the third marking extends beyond the first marking.

15. The apparatus of claim 12, wherein instructions, when executed by the one or more processors, cause the apparatus to:
  create a second marking where the second marking is a same shape as the first marking but decreased in size; and
  iterate a resizing of the second marking until the boundary of the object is identified.

16. The apparatus of claim 15, wherein the instructions, when executed by the one or more processors, cause the apparatus to:
  select a size of the second marking that is small enough that the size of the second marking may be increased without crossing an edge of a sub-region within which the second marking is located.

17. A non-transitory computer readable medium for storing computer instructions that when executed by at least one processor causes the at least one processor to perform a method for identifying an object of an image using a suggestive marking comprising:
  recognizing user input indicating a first marking to an image, the first marking being in relation to a visual object in the image, the object having a boundary, wherein the object is non-predefined;

performing edge detection about the suggestive marking to detect a first potential boundary in the image for the object;

performing edge detection at a predefined increment from the first potential boundary to detect a second potential boundary;

generating, based on the detected first and second potential boundaries, a plurality of output images, wherein each output image of the plurality of output images includes one of the first or second potential boundaries for the object; and providing the plurality of output images to allow for selection of an output image of the plurality of output images with a potential boundary that corresponds with the boundary of the object.

18. The non-transitory computer readable medium of claim 17, wherein the method further comprises:

receiving a selection of an output image of the plurality of output images displayed; and refining object selection on the selected output image.

19. The non-transitory computer readable medium of claim 17, wherein generating the plurality of output images further comprises, for each output image:

(i) dividing a region of the image associated with the first marking into a plurality of sub-regions;

(ii) for each sub-region of the plurality of sub-regions:

(a) creating a second marking within the sub-region wherein the second marking is a geometric shape circumscribed by a boundary of the sub-region;

(b) adjusting a size of the second marking by a predefined increment;

(c) generating an edge of the sub-region of the object using edge detection, where the second marking is an input to an edge detection algorithm;

(d) storing an output result of an area of the sub-region bounded by the generated edge;

(e) identifying a generated edge of the sub-region as a boundary of the object or a boundary of the sub-region by repeating steps (b), (c), and (d) until:

(1) if a portion of the first marking is in the sub-region, the generated edge of the sub-region deviates from a corresponding portion of the first marking;

(2) if a portion of the first marking is in the sub-region, the generated edge of the sub-region exceeds a delineation of the first marking; or (3) the second marking extends beyond boundary of the subregion; and (iii) combining the output result of each sub-region of the plurality of subregions to reconstruct the object of the region of the image.

20. The non-transitory computer readable medium of claim 17, wherein generating each output image in the plurality of output images further comprises:

(i) creating a second marking where the second marking is a same shape as the first marking and decreased in size;

(ii) increasing a size of the second marking by a predefined increment;

(iii) generating an edge of the object using edge detection, where the second marking is an input to an edge detection algorithm;

(iv) storing an output result of an area bounded by the edge generated; and (v) identifying a generated edge as a boundary of the object by repeating steps (ii), (iii), and (iv) until:

(a) the generated edge in the object is a predefined percentage of the first marking;

(b) the generated edge in the object exceeds a delineation of the first marking; or (c) the second marking extends beyond the first marking.

\* \* \* \* \*